United States Patent [19]

DeLuca et al.

[11] Patent Number: 5,611,851
[45] Date of Patent: Mar. 18, 1997

[54] PROCESS FOR PREPARING UNSUPPORTED METAL OXIDE NACREOUS PIGMENTS

[75] Inventors: Carmine DeLuca; William P. Kurtenbach, both of Peekskill, N.Y.

[73] Assignee: The Mearl Corporation, Ossining, N.Y.

[21] Appl. No.: 571,456

[22] Filed: Dec. 13, 1995

[51] Int. Cl.⁶ .................................................... C04B 14/32
[52] U.S. Cl. ........................ 106/415; 106/417; 106/436
[58] Field of Search ................................. 106/436, 417, 106/415

[56] References Cited

U.S. PATENT DOCUMENTS

| | | | |
|---|---|---|---|
| 4,192,691 | 3/1980 | Armanini | 106/417 |
| 4,883,539 | 11/1989 | Mattila et al. | 106/417 |
| 5,076,849 | 12/1991 | Vapaaoksa et al. | 106/436 |

FOREIGN PATENT DOCUMENTS 729535  3/1966  Canada ................... 106/415

*Primary Examiner*—Melissa Bonner
*Attorney, Agent, or Firm*—Ostrolenk, Faber, Gerb & Soffen, LLP

[57] ABSTRACT

A nacreous pigment is prepared by subjecting a metal oxide-coated mica nacreous pigment to an acid extractive dissolution using a combination of a mineral acid and phosphoric acid followed by an extractive dissolution using an alkali.

20 Claims, No Drawings

PROCESS FOR PREPARING UNSUPPORTED METAL OXIDE NACREOUS PIGMENTS

BACKGROUND OF THE INVENTION

Nacreous or pearlescent pigments exist in nature in the form of plate-like guanine microcrystals from fish. Because of high cost, source variations and unsuitability for some applications, a number of synthetic nacreous pigments have been developed.

One the most important synthetic nacreous pigments is titanium dioxide-coated mica which is composed of a mica platelet having an adherent crystalline titanium dioxide coating thereon. The color exhibited is a function of the thickness of the coating. The composite pigment has good reflectivity characteristics, high stability to heat and chemical agents and is non-toxic, which makes it suitable for cosmetic application. The titanium dioxide may be in the anatase form as described, e.g., in U.S. Pat. Nos. 3,087,827; 3,087,828; 3,418,146; and, 3,437,515, or in the rutile crystalline form as described in U.S. Pat. No. 4,038,099.

Metal oxides other than titanium dioxide have been used to prepare similar types of nacreous pigments by coating on the mica platelets. Some examples include ferric oxide (U.S. Pat. No. 3,087,829), zirconium dioxide (U.S. Pat. No. 3,087,828), tin dioxide (U.S. Pat. No. 4,040,859) and the like.

The metal oxide coating on the mica substrate has a high refractive index and provides the optical effects, including high luster or reflectivity, coverage, interference reflection color (if the metal oxide coating is sufficiently thick) and absorption color (if the metal oxide contains color material). The mica, on the other hand, has a low refractive index and essentially functions solely as a carrier or substrate, making almost no contribution to the optical effect of the pigment. However, the weight of the mica in such a pigment is significant, usually amounting to about 40%–90% and most usually in the range of 60%–80% of the entire weight.

Despite preparatory procedures, variations from the natural source of the mica persist into the final product. Most sources are unsuitable for use in nacreous pigments because they are quite dark or cannot be adequately ground to yield the desired dimensions for the pigment platelet substrates. In addition, mica darkens considerably during the calcination process used to prepare the metal oxide-coated mica product and this results in undesirable color effects. The weight contributed by the mica substrate can also be a problem in some applications because the maximum loading or concentration of the pigment is reached before an optimum in optical properties of the system is obtained.

Unsupported crystalline titanium dioxide platelet nacreous pigments are described in U.S. Pat. No. 3,861,946. The unsupported pigment is realized by coating the titanium dioxide on calcium sulfate chips and platelets followed by dissolving away the calcium sulfate substrate.

U.S. Pat. No. 4,192,691 describes the preparation of unsupported metal oxide nacreous pigments by treating a metal oxide-coated mica nacreous pigment with an aqueous acid solution containing hydrofluoric acid and mineral acid until the desired amount of mica has been extracted. The resulting pigment can be used in a wide variety of cosmetic and plastic applications and possesses improved stability, luster, mechanical integrity and other properties.

A number of the patents describe the removal of the substrate from metal oxide-coated substrates and particularly the dark mica varieties such as phlogopite and biotite. U.S. Pat. No. 4,883,539 describes a process in which a metal oxide-coated phlogopite mica pigment is treated with a mineral acid such as sulfuric acid, hydrochloric acid or nitric acid, preferably combined with some oxidizer such as nitric acid or hydrogen peroxide. As pointed out in U.S. Pat. No. 5,076,849, this results in a product which can be too heavy for certain purposes, can have too weak interference colors for producing the desired nacreous effect and it is difficult to grind the pigment particles into a suitable nacreous pigment size. The last named patent, therefore, seeks to improve the process by conducting a two step process in which the acidic extraction is followed by extracting the acid treated pigment with a base. This procedure is preferably applied to dark mica sorts such as phlogopite or biotite which have lower aluminum content and are therefore easier to dissolve rather than light mica sorts such as muscovite which do not favor a selective extraction of cations. A major problem with this two-step procedure, however, is that it generates an enormous amount of waste products, especially when muscovite mica is employed. For instance, approximately 20 parts of waste are generated for each part of final product produced. The necessity of disposing of such a large quantity of waste, together with environmental concerns, makes this process impractical.

It will be appreciated from the foregoing that there remains a need for a more efficient process of removing mica from metal oxide coated mica nacreous pigments. It is accordingly the object of the present invention to provide such a process.

SUMMARY OF THE INVENTION

The present invention relates to a new method for production of nacreous pigments useful for cosmetic formulations and in various plastic articles and automotive or other coatings. More particularly, the invention relates to a method for the preparation of such nacreous pigments by dissolving the micaceous substrate from the metal oxide coating without dissolving the coating. The dissolution is effected in a two step procedure in which the first step involves contacting the pigment with a mixture of a mineral acid and phosphoric acid, followed by contacting the pigment with a strong alkali.

DETAILED DESCRIPTION OF THE INVENTION

The unsupported metal oxide nacreous pigments of the present invention are prepared by subjecting the metal oxide-coated mica nacreous pigment to an extractive dissolution in acid followed by an extractive dissolution in alkali. The metal oxide-coated mica nacreous pigments can be any of those known heretofore such as those prepared by the methods described in any of the foregoing references. Any of the crystalline forms of the mica substrate can be used although the invention has particular applicability to the muscovite form of mica.

The acid extractant used in the method of the present invention is a combination of phosphoric acid and one or more mineral acids such as sulfuric acid, hydrochloric acid and nitric acid. In general, the acid solution can contain up to about 20% of the phosphoric acid, for instance about 1%–20%, preferably about 10%–15%, and up to about 35% of the mineral acid, for instance 5–35% and preferably about 25%–30%. The ratio of mineral acid to phosphoric acid can vary over a wide range of from 10:1 to 1:10 but preferably the mineral acid is present in excess such that the ratio is greater than about 1:1 up to about 3:1. The extractive dissolution is continued until the desired degree of aluminum and potassium components of the mica have been removed which can take as short a period of time as ¼ of an hour to as long as 20 hours or more, preferably about 4 to 8 hours. The extractive dissolution can be carried out at any convenient temperature such as those from about 20° C. to 150° C. As a general rule, the higher the temperature, the faster the dissolution. Preferably, the extractive dissolution takes place at reflux.

Following the extractive dissolution with the acid solution, the resulting metal oxide nacreous pigment is subjected to an extractive dissolution with the strong alkali. Any strong base can be used for this step although it is preferred to use either potassium hydroxide or, most preferably, sodium hydroxide because of their availability. The concentration of the base is generally up to about 40%, for instance about 1%–40% by weight, preferably about 5%–20% and most preferably about 12.5–17.5% by weight and it is advantageous to use an aqueous solution. The temperature of the base extraction step is not critical and any convenient temperature, preferably between about 20° and 110° C., can be used. Preferably the acid treated metal oxide nacreous pigment is slurried with an aqueous solution of the base until the desired degree of substrate has been removed which, in general, can take between ¼ and 20 hours or more but is most preferably about ½ to 3 hours.

Following the second extractive dissolution step, and if desired after the first dissolution step, the resulting metal oxide nacreous pigment can be recovered in any convenient fashion such as by filtering the slurry hot or cold, washing the filtered pigment and thereafter drying it.

As a result of the improved luster and color intensity achieved in the present invention, less of the unsupported metal oxide nacreous pigment is necessary than the metal oxide mica nacreous pigment from which it is derived to achieve at least equivalent pigment qualities. The amount of mica which is dissolved can be adjusted as desired and as the total amount of mica which is dissolved is increased, the luster or reflectivity of the product increases. In most cases, most of the mica will be dissolved such that the resulting product contains about 20% or less of mica. Preferably the resulting product contains about 10% or less of mica. A small residue of mica does not have an deleterious effects on the optical properties of the pigment and may contribute some improved mechanical properties to the resulting pigment platelet. It is possible, however, to dissolve all of the mica and realize a pigment composed entirely of metal oxide and having a further increased luster, if desired.

A significant advantage of the present invention is that the addition of the phosphoric acid aids in dissolving away the aluminum or potassium portions of the mica and allows the amount of mineral acid to be significantly reduced. For example, the addition of the phosphoric acid permits use of only ⅓ of the sulfuric acid otherwise needed to achieve a particular pigment. Therefore, the amount of waste is reduced by a factor of 3. This is demonstrated as follows.

A suspension was prepared by combining 90 grams of silver reflecting titanium dioxide-coated muscovite mica, 300 grams of sulfuric acid and 300 grams of distilled water. The suspension was refluxed (120° C.) for 6 hours and then cooled and filtered. The presscake was washed with distilled water until the effluent was at a pH of 2 and then without drying, slurried with 800 grams of distilled water. Sodium hydroxide (83 grams) were added to form a 9% sodium hydroxide solution and heat was applied to achieve a temperature of 60° C. After one hour, the suspension was filtered and the presscake washed until the effluent pH was 10. The product was dried for 14 hours at 100° C. to yield an unsupported titanium dioxide sample which was 90%–95% titanium dioxide. An equivalent product was achieved by repeating the foregoing procedure, replacing the 300 grams of sulfuric acid with 184 grams of acid constituted by a combination of 124 grams of sulfuric acid and 60 grams of phosphoric acid, and by increasing the refluxing time to 15 hours.

The foregoing comparison was repeated with other titanium dioxide-coated muscovite nacreous pigments of different titanium dioxide layer thicknesses (and thereby color) to determine the amount of waste generated. The results were as follows:

| Color | Parts of Waste/Per Part Product | |
|---|---|---|
| | Single Acid | Combined Acids |
| Pearl | 27 | 8.4 |
| Gold | 23 | 7.1 |
| Red | 20 | 6.4 |
| Blue | 18 | 5.6 |
| Green | 16 | 5.0 |

The foregoing procedure is repeated substituting equivalent amounts of hydrochloric acid or nitric acid for the sulfuric acid and KOH for the NaOH. Combinations of mineral acids and alkalis are also used.

The titanium dioxide used above was in the rutile crystalline form and similar results can be achieved with anatase $TiO_2$ or other metal oxides such as iron oxide. While particularly advantageous when the mica is muscovite, other mica forms such as phlogopite can also be removed by the process of this invention. The resulting unsupported pigments can be used in any application for which the supported pigments were employed, including without limitation, cosmetics, industrial products such as plastics, inks, coating, automobile finishes, and the like. In such applications, they provide better hiding or higher coverage, color purity, reflectivity and chemical purity (i.e., lower levels of trace impurities).

Various changes and modifications can be made in the process of the present invention without departing from the spirit and scope thereof. The various embodiments which have been disclosed herein were for the purpose of illustrating the invention but were not intended to limit it.

What is claimed is:

1. A method for the preparation of a nacreous pigment comprising subjecting a metal oxide coated mica nacreous pigment to a two step extractive dissolution, the first step comprising contacting the pigment with an aqueous acidic solution containing phosphoric acid and a mineral acid and the second step comprising contacting the pigment with an aqueous alkali solution.

2. The method of claim 1 in which the acid concentration is up to about 55%.

3. The method of claim 2 in which the ratio of mineral acid to phosphoric acid is at least 1:1.

4. The method of claim 3 in which the mineral acid is sulfuric acid.

5. The method of claim 4 in which the alkali is sodium hydroxide.

6. The method of claim 5 in which the metal oxide is titanium dioxide.

7. The method of claim 6 in which the mica is muscovite.

8. The method of claim 1 in which the mica is muscovite.

9. The method of claim 1 in which the alkali is sodium hydroxide.

10. The method of claim 1 in which the mineral acid is sulfuric acid.

11. The method of claim 10 in which the ratio of mineral acid to phosphoric acid is at least 1:1.

12. The method of claim 1 in which the ratio of mineral acid to phosphoric acid is at least 1:1.

13. The method of claim 1 in which the metal oxide is titanium dioxide.

14. The method of claim 1 in which the concentration of mineral acid is up to about 35% and the concentration of phosphoric acid is up to about 20%.

15. The method of claim 14 in which the concentration of mineral acid is about 5 to 35% and the concentration of phosphoric acid about 1 to 20%.

16. The method of claim 15 in which the concentration of mineral acid is about 25 to 30% and the concentration of phosphoric acid about 10 to 15%.

17. The method of claim 16 in which the ratio of mineral acid to phosphoric acid is at least 1:1.

18. The method of claim 17 in which the mineral acid is sulfuric acid and in which the alkali is sodium hydroxide.

19. The method of claim 18 in which the metal oxide is titanium dioxide.

20. The method of claim 19 in which the mica is muscovite.

* * * * *